Patented Feb. 10, 1953

2,628,242

UNITED STATES PATENT OFFICE 2,628,242

ORGANOSILICON COMPOSITIONS

Harold A. Clark, Midland, Mich., assignor to Dow Corning Corporation, Midland, Mich., a corporation of Michigan No Drawing. Application February 23, 1949, Serial No. 77,985

4 Claims. (Cl. 260—448.2)

This invention relates to dimeric organo silanes.

Compounds possessing the properties of high thermal stability, oxidation resistance, chemical inertness and good lubricating properties are desirable for use in many applications.

It is an object of this invention to prepare compounds which are useful as vacuum diffusion pump fluids, lubricants and constant temperature baths. Other objects and advantages will be apparent from the following description.

This invention relates to compounds of the type $R'_3Si$—$R$—$SiR'_3$ where each $R'$ is a phenyl or methyl radical and $R$ is a divalent organic radical of the group (—$C_6H_4$—), (—$C_6H_4C_6H_4$—) and (—$C_6H_4OC_6H_4$—).

Compounds of the above type may be prepared by any appropriate method. Such methods include reaction of a di-Grignard reagent with a chlorosilane, reaction of a phenyl or methyl Grignard with compounds of the type $Cl_3SiRSiCl_3$ and a Wurtz reaction between chlorosilanes and chloroprenyltriorganosilanes.

A preferred method is to react chlorosilanes of the type $R'_3SiCl$ with chlorophenylsilanes of the type $ClC_6H_4SiR'_3$ in the presence of an alkali metal such as sodium, potassium and lithium. The reaction is preferably carried out in toluene solution and the products are obtained by filtering off the alkali metal chloride and removing the solvent at reduced pressure.

The compounds of this invention range from low viscosity liquids to crylstalline solids. They are characterized by extreme thermal stability and high oxidation resistance. The materials are stable indefinitely at 350° C. in the absence of oxygen. In the presence of oxygen the compounds are stable indefinitely at 150° C. and will not oxidize if heated for limited periods up to 250° C. In addition these compounds are extremely stable to alkali and acid reagents. This is in contrast with the siloxanes which are rearranged by such reagents.

The above combination of properties makes the present compounds useful for many applications. Those which are liquid may be employed as lubricants and vacuum diffusion pump fluids. All of the compounds whether liquid or solid are useful as constant temperature baths.

In order that those skilled in the art may better understand this invention recourse may be had to the following examples which should be considered as illustrative only.

EXAMPLES

Example 1

104.5 g. of mixed isomers of chlorophenyltrimethylsilane was mixed with 167 g. of triphenylchlorosilane and added to 200 cc. of toluene. The toluene solution was then added to 28.7 g. of molten sodium in 500 cc. of refluxing toluene. The reaction was exothermic and the solvent was maintained at reflux by adjusting the rate of addition of the chloro compounds. After addition of the silanes was complete the reaction mixture was filtered free of sodium chloride and unreacted sodium and the toluene was removed under reduced pressure. The residue was the mixed isomers of triphenylsilyltrimethylsilylbenzene which were a sticky wax boiling at 205°–215° C.

The p-triphenylsilyltrimethylsilylbenzene was isolated from the above mixed isomers by fractional crystallization. This compound has a melting point of 162.5° C.

Example 2

The ortho, meta and para isomers of bistrimethylsilylbenzene were prepared and isolated as follows:

97 g. of 1,bromo,4,chlorobenzene was dissolved in ether and added to 12.5 g. of magnesium in 100 cc. of ether. Reaction occurred to produce parachlorophenylmagnesiumbromide. The reaction was complete in two hours. 60 g. of trimethylchlorosilane was added to the Grignard reagent and the mixture was refluxed for 20 hours. The coupling product was poured onto ice and dilute HCl and the ether layer was separated and washed with sodium bicarbonate until neutral. The ether was removed by evaporation, leaving as a residue parachlorophenyltrimethylsilane. This compound was mixed with 60 g. of trimethylchlorosilane and the mixture was added to 200 cc. of toluene. The toluene solution was then added to 27 g. of molten sodium in 200 cc. of refluxing toluene. The reaction mixture was refluxed for 4 hours, filtered and the toluene removed at reduced pressure. The 1,4 trimethylsilylbenzene was obtained as a crystalline product which after recrystallization from absolute ethanol was in the form of colorless needles which melted at 88° C.

1,3 trimethylsilylbenzene was prepared in the same manner from 1 bromo 3 chlorobenzene. The meta isomer is a liquid boiling at 112° C. at 22 mm., has a freezing point of —26° C. The refractive index is 1.4867 and 25° C. and the molar refraction is 73.62.

1,2 trimethylsilylbenzene was prepared by reacting orthochlorophenyltrimethylsilane with trimethylchlorosilane in the presence of metallic sodium in the manner of Example 1. The product is a liquid having a boiling point at 135° C. at 20 mm. and a refractive index of 1.5110 at 25° C. The molar refraction was found to be 74.7,

Example 3

4,4' trimethylsilylbiphenyl was prepared as follows:

78 g. of 4,4' dibromobiphenyl was mixed with 69 g. of trimethylchlorosilane and the mixture was dissolved in 300 cc. of toluene. The toluene solution was added to 25 g. of molten sodium in 500 cc. of refluxing toluene. The mixture was refluxed for 22 hours, filtered and the toluene was removed at reduced pressure leaving a viscous liquid which distilled at 150° C. and 1 mm. The distillate crystallized upon standing. The material was recrystallized from absolute ethanol yielding colorless needles which melted at 79° C.

Example 4

The compound 4,4' phenyldimethylsilylbiphenyl was prepared by reacting 76.4 g. of 4,4' dibromodiphenyl, 85.3 g. of phenyldimethyl chlorosilane and 25 g. of molten sodium in the manner of Example 4. The product was solid, boiling at 241° C. at 1 mm. and having a melting point of 75° C.

Example 5

The compound 4,4' phenyldimethylsilyldiphenylether was prepared according to the procedure of Example 3 by reacting 82 g. of 4,4' dibromodiphenyl ether, 83.5 g. of dimethylphenylchlorosilane and 25 g. of molten sodium. The product is an oil having a viscosity of 814 cs. at 25° C., boiling point of 249° C. at 2.5 mm. and a freezing point of −8° C. The molar refraction was found to be 140.77.

That which is claimed is:

1. A compound having the formula $R'_3SiRSiR'_3$ where each $R'$ is a monovalent hydrocarbon radical selected from the group consisting of phenyl and methyl radicals, and R is a di-valent organic radical selected from the group consisting of $-C_6H_4-$, $-C_6H_4C_6H_4-$ and $-C_6H_4OC_6H_4-$.

2. A compound having the formula $$R'_3SiC_6H_4SiR'_3$$

where each $R'$ is selected from the group consisting of methyl and phenyl radicals.

3. A compound having the formula $$R'_3SiC_6H_4C_6H_4SiR'_3$$

where each $R'$ is selected from the group consisting of methyl and phenyl radicals.

4. A compound having the formula $$R'_3SiC_6H_4OC_6H_4SiR'_3$$

where each $R'$ is selected from the group consisting of methyl and phenyl radicals.

HAROLD A. CLARK.

REFERENCES CITED

The following references are of record in the file of this patent:

UNITED STATES PATENTS

| Number | Name | Date |
|---|---|---|
| 2,352,974 | Rochow | July 4, 1944 |
| 2,383,817 | Rochow | Aug. 28, 1945 |
| 2,444,858 | Spier | July 6, 1948 |
| 2,452,895 | Bluestein | Nov. 2, 1948 |

OTHER REFERENCES

Gruttner, "Berichte," vol. 51 (1918), page 1289.

Burkhardt, "Jour. Am. Chem. Soc.," vol. 68 (1946), page 2103.

Goodwin, "Jour. Am. Chem. Soc.," vol. 69 (1947), page 2247.